US009606634B2

(12) United States Patent  
Assadollahi

(10) Patent No.: US 9,606,634 B2  
(45) Date of Patent: Mar. 28, 2017

(54) DEVICE INCORPORATING IMPROVED TEXT INPUT MECHANISM

(75) Inventor: Ramin O. Assadollahi, Constance (DE)

(73) Assignee: Nokia Technologies Oy, Esppo (FI)

( * ) Notice: Subject to any disclaimer, the term of this patent is extended or adjusted under 35 U.S.C. 154(b) by 511 days.

(21) Appl. No.: 11/560,668

(22) Filed: Nov. 16, 2006

(65) Prior Publication Data

US 2007/0074131 A1 Mar. 29, 2007

Related U.S. Application Data

(63) Continuation-in-part of application No. 11/131,867, filed on May 18, 2005.

(30) Foreign Application Priority Data

May 16, 2006 (EP) ..................................... 06010096

(51) Int. Cl.
- *G06F 3/00* (2006.01)
- *G06F 3/023* (2006.01)
- *G06F 17/27* (2006.01)

(52) U.S. Cl.  
CPC .......... *G06F 3/0237* (2013.01); *G06F 17/276* (2013.01); *G06F 17/2735* (2013.01)

(58) Field of Classification Search  
CPC ............. G06F 17/2872; G06F 17/3061; G06F 3/0237; G06F 17/2735; G06F 17/276  
USPC ........................................ 715/234, 243, 254  
See application file for complete search history.

(56) References Cited

U.S. PATENT DOCUMENTS

| 5,109,352 A | 4/1992 | O'Dell |
| 5,305,205 A | 4/1994 | Weber et al. |
| 5,541,836 A | 7/1996 | Church et al. |
| 5,623,406 A | 4/1997 | Ichbiah |

(Continued)

FOREIGN PATENT DOCUMENTS

| CA | 2601859 | 6/2000 |
| CA | 2547143 | 11/2006 |

(Continued)

OTHER PUBLICATIONS

Forney Jr., G. David, "The Viterbi Algorithm," 1973K, Proceedings of the IEEE, pp. 268-278.*

(Continued)

*Primary Examiner* — Kyle Stork  
(74) *Attorney, Agent, or Firm* — Alston & Bird LLP

(57) ABSTRACT

A device including a display screen for displaying m-words of data, a text entry device for entering data, a processor receiving data from the text entry device and causing it to be displayed on the display screen. Upon activation the processor initializes a precursor to a predefined value. The device further includes a non-volatile memory storing a dictionary containing a plurality of entries, each entry including an index, a candidate word, and a score. The processor selects a list of n-number of candidate words from the dictionary whose index matches the precursor, and causes m-number of candidate words from the list of candidate words to be displayed on the display screen. The processor causes the display to prompt the user to select one of the displayed candidate words or enter a desired word using the text entry device. Furthermore, a tech-mode for extending a word dictionary for word-based text input is provided.

15 Claims, 8 Drawing Sheets

(56) References Cited

U.S. PATENT DOCUMENTS

| | | |
|---|---|---|
| 5,748,512 A | 5/1998 | Vargas |
| 5,805,911 A | 9/1998 | Miller |
| 5,818,437 A | 10/1998 | Grover et al. |
| 5,945,928 A | 8/1999 | Kushler et al. |
| 5,952,942 A | 9/1999 | Balakrishnan et al. |
| 5,953,541 A | 9/1999 | King et al. |
| 5,963,671 A | 10/1999 | Comerford et al. |
| 6,005,495 A | 12/1999 | Connolly et al. |
| 6,005,498 A | 12/1999 | Yang et al. |
| 6,011,554 A | 1/2000 | King et al. |
| 6,219,731 B1 | 4/2001 | Gutowitz |
| 6,223,059 B1 | 4/2001 | Haestrup |
| 6,286,064 B1 | 9/2001 | King et al. |
| 6,307,548 B1 | 10/2001 | Flinchem et al. |
| 6,307,549 B1 | 10/2001 | King et al. |
| 6,362,752 B1 | 3/2002 | Guo et al. |
| 6,363,347 B1 | 3/2002 | Rozak |
| 6,377,965 B1 | 4/2002 | Hachamovitch et al. |
| 6,405,060 B1 | 6/2002 | Schroeder et al. |
| 6,473,006 B1 | 10/2002 | Yu et al. |
| 6,636,162 B1 | 10/2003 | Kushler et al. |
| 6,646,573 B1 | 11/2003 | Kushler et al. |
| 6,712,534 B2 | 3/2004 | Patel |
| 6,766,179 B1 | 7/2004 | Shiau et al. |
| 6,926,528 B2 | 8/2005 | Dolan |
| 6,955,602 B2 | 10/2005 | Williams |
| 7,075,520 B2 | 7/2006 | Williams |
| 7,103,852 B2 | 9/2006 | Kairis, Jr. |
| 7,111,248 B2 | 9/2006 | Mulvey et al. |
| 7,286,115 B2 | 10/2007 | Longe et al. |
| 7,296,021 B2 | 11/2007 | Malkin et al. |
| 7,319,957 B2 | 1/2008 | Robinson et al. |
| 7,395,203 B2 | 7/2008 | Wu et al. |
| 7,443,316 B2 | 10/2008 | Lim |
| 7,461,059 B2 | 12/2008 | Richardson et al. |
| 7,475,072 B1 | 1/2009 | Ershov |
| 7,480,619 B1 | 1/2009 | Scott |
| 7,487,145 B1 | 2/2009 | Gibbs et al. |
| 7,580,829 B2 | 8/2009 | James et al. |
| 7,580,925 B2 | 8/2009 | Unruh et al. |
| 7,587,378 B2 | 9/2009 | Van Meurs |
| 7,610,194 B2 | 10/2009 | Bradford et al. |
| 7,617,200 B2 | 11/2009 | Budzik et al. |
| 7,679,534 B2 | 3/2010 | Kay et al. |
| 7,712,053 B2 | 5/2010 | Bradford et al. |
| 7,720,682 B2 | 5/2010 | Stephanick et al. |
| 7,725,485 B1 | 5/2010 | Sahami et al. |
| 7,750,891 B2 | 7/2010 | Stephanick et al. |
| 7,840,579 B2 | 11/2010 | Samuelson et al. |
| 7,840,770 B2 | 11/2010 | Larson |
| 8,036,878 B2 | 10/2011 | Assadollahi |
| 8,117,540 B2 | 2/2012 | Assadollahi |
| 8,374,846 B2 | 2/2013 | Assadollahi |
| 8,635,236 B2 | 1/2014 | Lee et al. |
| 2001/0020212 A1 | 9/2001 | Urban et al. |
| 2002/0021311 A1 | 2/2002 | Shechter et al. |
| 2002/0075323 A1 | 6/2002 | O'Dell |
| 2002/0077808 A1 | 6/2002 | Liu et al. |
| 2002/0078106 A1* | 6/2002 | Carew et al. ............ 707/533 |
| 2002/0126097 A1 | 9/2002 | Savolainen |
| 2002/0152203 A1 | 10/2002 | Ostergaard et al. |
| 2002/0163504 A1 | 11/2002 | Pallakoff |
| 2002/0180689 A1 | 12/2002 | Venolia |
| 2002/0196163 A1 | 12/2002 | Bradford et al. |
| 2003/0011574 A1 | 1/2003 | Goodman |
| 2003/0023420 A1 | 1/2003 | Goodman |
| 2003/0023426 A1 | 1/2003 | Pun et al. |
| 2003/0030573 A1 | 2/2003 | Ure |
| 2003/0054830 A1 | 3/2003 | Williams et al. |
| 2003/0061025 A1 | 3/2003 | Abir |
| 2003/0064686 A1 | 4/2003 | Thomason et al. |
| 2003/0097252 A1 | 5/2003 | Mackie |
| 2003/0104839 A1* | 6/2003 | Kraft et al. ............ 455/566 |
| 2003/0107555 A1 | 6/2003 | Williams |
| 2003/0144830 A1 | 7/2003 | Williams |
| 2003/0234821 A1 | 12/2003 | Pugliese |
| 2004/0017946 A1 | 1/2004 | Longe et al. |
| 2004/0024584 A1 | 2/2004 | Brill |
| 2004/0056844 A1 | 3/2004 | Gutowitz et al. |
| 2004/0070567 A1 | 4/2004 | Longe et al. |
| 2004/0083198 A1 | 4/2004 | Bradford et al. |
| 2004/0095327 A1 | 5/2004 | Lo |
| 2004/0122979 A1 | 6/2004 | Kirkland |
| 2004/0140956 A1 | 7/2004 | Kushler et al. |
| 2004/0153963 A1 | 8/2004 | Simpson et al. |
| 2004/0153975 A1* | 8/2004 | Williams et al. ............ 715/531 |
| 2004/0160419 A1 | 8/2004 | Padgitt |
| 2004/0163032 A1 | 8/2004 | Guo et al. |
| 2004/0176114 A1 | 9/2004 | Northcutt |
| 2005/0017954 A1 | 1/2005 | Kay et al. |
| 2005/0043949 A1* | 2/2005 | Roth et al. ............ 704/251 |
| 2005/0060448 A1 | 3/2005 | Gutowitz |
| 2005/0114770 A1 | 5/2005 | Sacher et al. |
| 2005/0188330 A1 | 8/2005 | Griffin |
| 2005/0192802 A1 | 9/2005 | Robinson et al. |
| 2005/0240391 A1 | 10/2005 | Lekutai |
| 2005/0275632 A1 | 12/2005 | Pu et al. |
| 2005/0283358 A1 | 12/2005 | Stephanick et al. |
| 2005/0283364 A1 | 12/2005 | Longe et al. |
| 2006/0013487 A1 | 1/2006 | Longe et al. |
| 2006/0018545 A1 | 1/2006 | Zhang et al. |
| 2006/0025091 A1 | 2/2006 | Buford |
| 2006/0123354 A1 | 6/2006 | Volovitz |
| 2006/0136408 A1 | 6/2006 | Weir et al. |
| 2006/0158436 A1 | 7/2006 | LaPointe et al. |
| 2006/0167689 A1 | 7/2006 | Maren |
| 2006/0167872 A1* | 7/2006 | Parikh ............ 707/6 |
| 2006/0173807 A1 | 8/2006 | Weir et al. |
| 2006/0190256 A1 | 8/2006 | Stephanick et al. |
| 2006/0190447 A1 | 8/2006 | Harmon et al. |
| 2006/0236239 A1 | 10/2006 | Simpson et al. |
| 2006/0242576 A1 | 10/2006 | Nagel et al. |
| 2006/0247915 A1 | 11/2006 | Bradford et al. |
| 2006/0256139 A1 | 11/2006 | Gikandi |
| 2006/0259479 A1 | 11/2006 | Dai |
| 2006/0265208 A1 | 11/2006 | Assadollahi |
| 2007/0030249 A1 | 2/2007 | Griffin et al. |
| 2007/0075915 A1 | 4/2007 | Cheon et al. |
| 2007/0076862 A1 | 4/2007 | Chatterjee et al. |
| 2007/0094718 A1 | 4/2007 | Simpson |
| 2007/0106785 A1 | 5/2007 | Tandon |
| 2007/0203879 A1 | 8/2007 | Templeton-Steadman et al. |
| 2007/0205983 A1 | 9/2007 | Naimo |
| 2007/0216651 A1 | 9/2007 | Patel |
| 2007/0226649 A1 | 9/2007 | Agmon |
| 2007/0268264 A1 | 11/2007 | Aarras et al. |
| 2007/0285397 A1 | 12/2007 | LaPointe et al. |
| 2008/0034081 A1 | 2/2008 | Marshall et al. |
| 2008/0072143 A1 | 3/2008 | Assadollahi |
| 2008/0072145 A1 | 3/2008 | Blanchard et al. |
| 2008/0076472 A1 | 3/2008 | Hyatt |
| 2008/0138135 A1 | 6/2008 | Gutowitz |
| 2008/0154576 A1 | 6/2008 | Wu et al. |
| 2008/0159841 A1 | 7/2008 | Keller |
| 2008/0189605 A1 | 8/2008 | Kay et al. |
| 2008/0195388 A1 | 8/2008 | Bower et al. |
| 2008/0235003 A1 | 9/2008 | Lai et al. |
| 2008/0244446 A1 | 10/2008 | LeFevre et al. |
| 2008/0263015 A1 | 10/2008 | Qiu et al. |
| 2008/0266263 A1 | 10/2008 | Motaparti et al. |
| 2008/0288665 A1 | 11/2008 | Williams |
| 2008/0291059 A1 | 11/2008 | Longe |
| 2008/0294982 A1 | 11/2008 | Leung et al. |
| 2009/0019002 A1 | 1/2009 | Boulis |
| 2009/0037371 A1 | 2/2009 | Unruh et al. |
| 2009/0055732 A1 | 2/2009 | Motaparti et al. |
| 2009/0077037 A1 | 3/2009 | Wu et al. |
| 2009/0092323 A1 | 4/2009 | Qiu et al. |
| 2009/0150383 A1 | 6/2009 | Qiu et al. |
| 2009/0154682 A1 | 6/2009 | Qiu |
| 2009/0192786 A1 | 7/2009 | Assadollahi |
| 2009/0193334 A1 | 7/2009 | Assadollahi |
| 2009/0202973 A1 | 8/2009 | Fitzgerald et al. |
| 2009/0306969 A1 | 12/2009 | Goud et al. |

(56) References Cited

U.S. PATENT DOCUMENTS

| | | |
|---|---|---|
| 2010/0121876 A1 | 5/2010 | Simpson et al. |
| 2010/0122164 A1 | 5/2010 | Kay et al. |
| 2010/0161538 A1 | 6/2010 | Kennedy, Jr. et al. |
| 2010/0174529 A1 | 7/2010 | Bradford et al. |
| 2010/0188338 A1 | 7/2010 | Longe |
| 2010/0228710 A1 | 9/2010 | Imig et al. |
| 2010/0277416 A1 | 11/2010 | Longe et al. |
| 2011/0071834 A1 | 3/2011 | Kristensson et al. |
| 2011/0197128 A1 | 8/2011 | Assadollahi |
| 2011/0197152 A1 | 8/2011 | Assadollahi |
| 2012/0005576 A1 | 1/2012 | Assadollahi |

FOREIGN PATENT DOCUMENTS

| | | |
|---|---|---|
| EP | 0 858 023 A2 | 8/1998 |
| EP | 0930760 | 7/1999 |
| EP | 1347361 | 9/2003 |
| EP | 1347361 A1 | 9/2003 |
| EP | 1701 243 A | 9/2006 |
| EP | 1724692 | 11/2006 |
| GB | 2399202 | 9/2004 |
| WO | WO 00/57265 A1 | 9/2000 |
| WO | WO-02/33527 A2 | 4/2002 |
| WO | WO 02/091160 A1 | 11/2002 |
| WO | 2005036413 | 4/2005 |
| WO | WO2005036413 A | 4/2005 |
| WO | 2006080927 | 8/2006 |
| WO | 2006080935 | 8/2006 |
| WO | 2008034112 | 3/2008 |
| WO | WO 2008/030563 A2 | 3/2008 |

OTHER PUBLICATIONS

Kashyap et al. Spelling correction using probabilistic methods, Mar. 1984, pp. 147-154.*
European Patent Office, Communication Pursuant to Article 94(3) EPC for Application No. 08006936.2, dated Jan. 7, 2013, 4 pages, Germany.
Office Action for U.S. Appl. No. 13/229,769 dated Jan. 24, 2012.
Office Action for U.S. Appl. No. 11/131,867 dated Apr. 2, 2008.
Office Action for U.S. Appl. No. 11/131,867 dated Jan. 16, 2009.
Office Action for U.S. Appl. No. 11/131,867 dated Aug. 19, 2009.
Office Action for U.S. Appl. No. 11/131,867 dated Dec. 2, 2010.
Notice of Allowance for U.S. Appl. No. 11/131,867 dated Jun. 29, 2011.
Office Action for U.S. Appl. No. 12/181,273 dated Jul. 20, 2011.
Office Action for U.S. Appl. No. 12/181,273 dated Nov. 23, 2011.
Notice of Allowance for U.S. Appl. No. 12/181,273 dated May 22, 2012.
Office Action for U.S. Appl. No. 11/940,400 dated Oct. 4, 2010.
Office Action for U.S. Appl. No. 11/940,400 dated Jul. 12, 2011.
Notice of Allowance for U.S. Appl. No. 11/940,400 dated Nov. 2, 2011.
Office Action for U.S. Appl. No. 12/416,891 dated Jun. 23, 2011.
Office Action for U.S. Appl. No. 12/416,891 dated Nov. 22, 2011.
Search Report for EP Application No. 06 024049.6.
U.S. Appl. No. 11/470,579.
Dunlop, M. D. et al., *Predictive Text Entry Methods for Mobile Phones*, Personal Technologies 4, (2000) 134-143.
Mankoff, J. et al., *Cirrin: A Word-Level Unistroke Keyboard for Pen Input*, Proceedings of UIST, Technical Note (1998) 213-214.
Schneider-Hufschmidt, M., *Usability Issues of Sending Text Messages*, The Kluwer International Series on Computer Supported Cooperative work, vol. 4, No. 5 (2005) 223-236.
Assadollahi, R., Pulvermu" ller, F., 2003. Early influences of word length and frequency: a group study using MEG. NeuroReport 14,1183-1187.
Jones, P. E., Virtual keyboard with scanning and augmented by prediction, Proc 2nd European Conference on Disability, Virtual Reality and Associated Technologies, (University of Reading, UK, 1998),45-51.
Hollis Weber, "Taming Microsoft Word 2002", 122 Pages, published on Oct. 10, 2002.
Potipiti, T., Sornlertlamvanich, V., & Thanadkran, K. (2001). Towards an intelligent multilingual keyboard system. Paper presented at the Human Language Technology Conference (HL T 2001), Mar. 18-21, 2001, San Diego.
Canadian Intellectual Property Office, Requisition by the Examiner for Application No. 2,547,143, dated Jul. 23, 2012, 8 pages, Canada.
European Search Report for European Application No. 08006936.2 dated Sep. 30, 2008.
Partial European Search Report for European Application No. 06010096.3 dated Sep. 29, 2006.
European Search Report for European Application No. 06010096.3 dated Dec. 20, 2006.
European Search Report for European Application No. 07113700.4 dated Nov. 7, 2007.
Office Action for European Application No. 07 113 700.4 dated Mar. 23, 2010.
Office Action for European Application No. 07 113 700.4 dated Feb. 1, 2011.
Office Communication for European Application No. 07 113 700.4 dated Mar. 28, 2011.
Office Action for European Application No. 06 024 049.6 dated Oct. 20, 2009.
Office Action for European Application No. 06 024 049.6 dated Aug. 17, 2010.
Summons to Attend Oral Proceedings for European Application No. 06 024 049.6 dated May 15, 2014.
Office Action for U.S. Appl. No. 12/416,891 dated Jun. 30, 2016.
Hasselgren, J., et al.; "*HMS: A Predictive Text Entry Method Using Bigrams*;" Lund Institute of Technology—Department of Computer Science; dated 2003.
Matiasek, J. et al.; "*Exploiting long distance collocational relations in predictive typing*;" Proceedings of the EACL-03 Workshop on Language Modeling for Text Entry Methods; dated 2003.
Office Action for U.S. Appl. No. 11/131,867; dated Feb. 24, 2010.
Office Action for U.S. Appl. No. 12/181,273; dated Aug. 31, 2012.
Office Action for U.S. Appl. No. 13/229,769; dated Aug. 27, 2012.
Kuo et al. "Tag Clouds for Summarizing," May 8, 2007, Proceedings of the 16th International Conference on World Wide Web, pp. 1203-1204.
Bernhard E, "Multilingual Term Extraction from Domain-specific Corpora using Morphological Structure," 2006, Proceedings from the Eleventh Conference of the European Chapter of the Association for Computer Linguistics: Posters and Demonstrations, pp. 171-174.
Hearst et al. "Tag Coulds: Data Analysis Tool of Social Signaller?" 2008, Proceedings of the 41st Hawaii International Conference on System Sciences, pp. 1-10.
Assadollahi, R; Pulvermu,Iler; 2003, Early Influences of Word Length and Frequency: A Group Study Using MEG NeuoReport 14, 1183-1187.
Sam A. Inverso, Nick Hawes, John Kelleher, Rebecca Allen and Ken Haase "Think and Spell: Context-Sensitive Predictive Text for an Ambiguous Keyboard Brain-Computer Interface Speller" Biomedzinische Technik, [online] D vol. 49, No. Sep. 1, 2004.
Tom Stocky, Alexander Faaborg, Henry Lieberman "A Common-sense Approach to Predictive Text Entry" Proceedings of Conference on Human Factors.
Pereira et al., Beyond word N-grams. In David Yarovsky and Kenneth Church, editors, Proceedings of the Third Workshop on Very Large Corpora, pp. 95-106, Somerset, New Jersey, 1995.
Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.
Office Action for U.S. Application No. 12/416,891 dated Aug. 28, 2014.
Office Action for U.S. Application No. 12/416,891 dated May 21, 2015.

* cited by examiner

FIG. 4

| TABLE 1 | | | | |
|---|---|---|---|---|
| Word | Frequency | | Word | Frequency |
|  | 4 | | mat | 1 |
| The | 3 | | dog | 2 |
| cat | 2 | | came | 1 |
| sat | 1 | | along | 1 |
| on | 1 | | chased | 1 |
| the | 2 | | | |

FIG. 5

| TABLE 2 | | | | |
|---|---|---|---|---|
| Words | Frequency | | Words | Frequency |
| The | 3 | | dog came | 1 |
| The cat | 1 | | came along | 1 |
| cat sat | 1 | | along | 1 |
| sat on | 1 | | dog chased | 1 |
| on the | 1 | | chased the | 1 |
| the mat | 1 | | the cat | 1 |
| mat | 1 | | cat | 1 |
| The dog | 2 | | | |

FIG. 6

| TABLE 3 | |
|---|---|
| Word | Frequency |
|  | 4/19 = 0.21 |
| The | 3/19 = 0.15 |
| cat | 2/19 = 0.10 |
| sat | 1/19 = 0.05 |
| on | 1/19 = 0.05 |
| the | 2/19 = 0.10 |
| mat | 1/19 = 0.05 |
| dog | 2/19 = 0.10 |
| came | 1/19 = 0.05 |
| along | 1/19 = 0.05 |
| chased | 1/19 = 0.05 |

FIG. 7

| TABLE 4 | |
|---|---|
| Word | Category |
| The, the, a | DETERMINER |
| little, red | ADJECTIVE |
| girl, car | NOUN |
| sat, drove | VERB |

FIG. 8

| TABLE 5 | | |
|---|---|---|
| Precursor | Candidate | Frequency |
| DETERMINER ADJECTIVE | NOUN | 1 |
| DETERMINER | NOUN | 5 |
| NOUN | VERB | 4 |
| DETERMINER NOUN | VERB | 2 |

DEVICE INCORPORATING IMPROVED TEXT INPUT MECHANISM

CLAIM OF PRIORITY

This application is a continuation in part of U.S. application Ser. No. 11/131,867 filed May 18, 2005 and also claims priority from EU 06010096.3 filed May 16, 2006.

FIELD OF THE INVENTION

The present invention relates to a device incorporating an improved text input mechanism, a method for improved text input and a computer program for performing the method. More particularly, the present invention relates to a device such as a personal digital assistant or cellular telephone which incorporates a method for contextual prediction of the next word of text to be input. The method of the present invention minimizes the number of keystrokes necessary to input text.

BACKGROUND OF THE INVENTION

The use of miniature computers such as personal digital assistants (PDA) and cellular devices capable of text messaging has become increasingly popular. Such miniature devices include correspondingly miniature sized input mechanisms. Typically PDA's and the like utilize a miniature keyboard or a multi-tap data entry mechanism. The miniature size of the input mechanism makes it impractical to enter large amounts of text, and it is desirable to minimize the number of keystrokes necessary to enter text.

Prior approaches for minimizing the number of keystrokes have focused on so-called disambiguating methods in which the system refines its guess of the text being entered as the user enters each letter of text. U.S. Pat. Nos. 5,818,437, 5,953,541 and U.S. patent publication numbers 20020152203, 20020163504, and 20020126097 are representative of the state of the prior art.

The prior art approach is akin to thumbing through a dictionary. The system "flips" to the appropriate section of the dictionary once the initial letter is entered, and displays words beginning with the initial letter. Due to limitations in the size of the display, only the first n words are displayed. If the desired word happens to occur within the first n words then the user may select the desired word from the list of n words.

If the desired word does not appear, then the user enters the second letter, whereupon the system displays words beginning with the first two letters. If the desired word occurs within the displayed list of n words then the user may select the desired word from the list.

If the desired word does not appear, then the user then enters the third letter, whereupon the system displays words beginning with the first three letters. The user continues to enter letters until either the desired word is displayed in the list of n words or the word is fully entered.

The aforementioned approach has not sufficiently reduced the number of keystrokes. Accordingly, what is needed is an improved method for reducing the number of keystrokes necessary to enter text.

SUMMARY OF THE INVENTION

Disclosed is a device incorporating a predictive text entry mechanism, a predictive text input method and a computer program for performing the method. The device includes a display screen for displaying m-words of data, a text entry device for entering data, a processor receiving data from the text entry device and causing it to be displayed on the display screen, wherein upon activation said processor initializes a precursor to a predefined value. The device is provided with a non-volatile memory storing a dictionary containing a plurality of entries, each such entry including an index, a candidate word, and a score. The processor selecting a list of n-number of candidate words from the dictionary whose index matches the precursor (i.e. the context). The processor causing m-number of candidate words from the list of candidate words to be displayed on the display screen. The processor causing the display to prompt the user to select one of the displayed candidate words or enter a desired word using said text entry device.

In response to the selection of a candidate word, the processor updates the precursor appending the selected candidate word to the end of the precursor, deleting the leading word, selecting a new list of candidate words whose index word matches the precursor, and causing the display to prompt the user to either select one of the displayed candidate words or enter a desired word using the text entry device.

According to another aspect of the invention, the processor may receive a sequence of key codes, each key code being assigned to a plurality of letters from the alphabet. The processor may determine a suggested sequence of letters corresponding to the sequence of key codes, cause the display screen to display the suggested letter sequence and prompt the user to correct a letter of the sequence. In response to a corrected letter, the processor may re-calculate the suggested sequence of letters. The processor may repeat the displaying, prompting and re-calculation until the user inputs a confirmation signal indicating that the displayed letter sequence corresponds to an intended word. Preferably, the suggested sequence of letters is determined based on letter transition probabilities.

According to another aspect of the invention, a keyboard with dedicated keys for operation on the word level is provided. A WordBack key deletes the last word. An Up'n'Blank key capitalises the last word and adds a blank (space) character to the text input.

Further disclosed is a device incorporating a mechanism for adding words to a dictionary, a method for extending a dictionary and a computer program for performing the method.

BRIEF DESCRIPTION OF THE DRAWINGS

FIG. 4 is a table showing a one-word dictionary according to the present invention;

FIG. 5 is a table showing a two-word dictionary according to the present invention;

FIG. 6 is a table showing normalization of the one-gram dictionary of FIG. 4;

FIG. 7 is a table used to decode a word of text into a grammatical representation;

FIG. 8 is a table used to determine a candidate word using a grammatical representation;

DETAILED DESCRIPTION OF THE PREFERRED EMBODIMENTS

The present invention provides an efficient method for inputting text, and is particularly suited for cellular telephones, handheld computers such as personal digital assistants, and other devices requiring data entry.

The present invention is indifferent to the specific method for inputting text. Text may be entered using a keyboard, a virtual keyboard such as a touch screen, a so-called Graffiti style of writing popularized by the PALM® operating system, or any other man-machine interface.

The basic concept underlying the present invention is that the next item of text is predicted based on the preceding word or words of text. Furthermore, non-linguistic contexts (such as the identification of a text field as "address field") may be used to predict words.

According to a first embodiment, the system provides a list of candidate words for the next word of text based on the preceding word or delimiter. However, as will be explained below, the present invention may readily be adapted to predict the next word based on any combination of preceding words or delimiters and/or linguistic analysis thereof.

Figure 1:
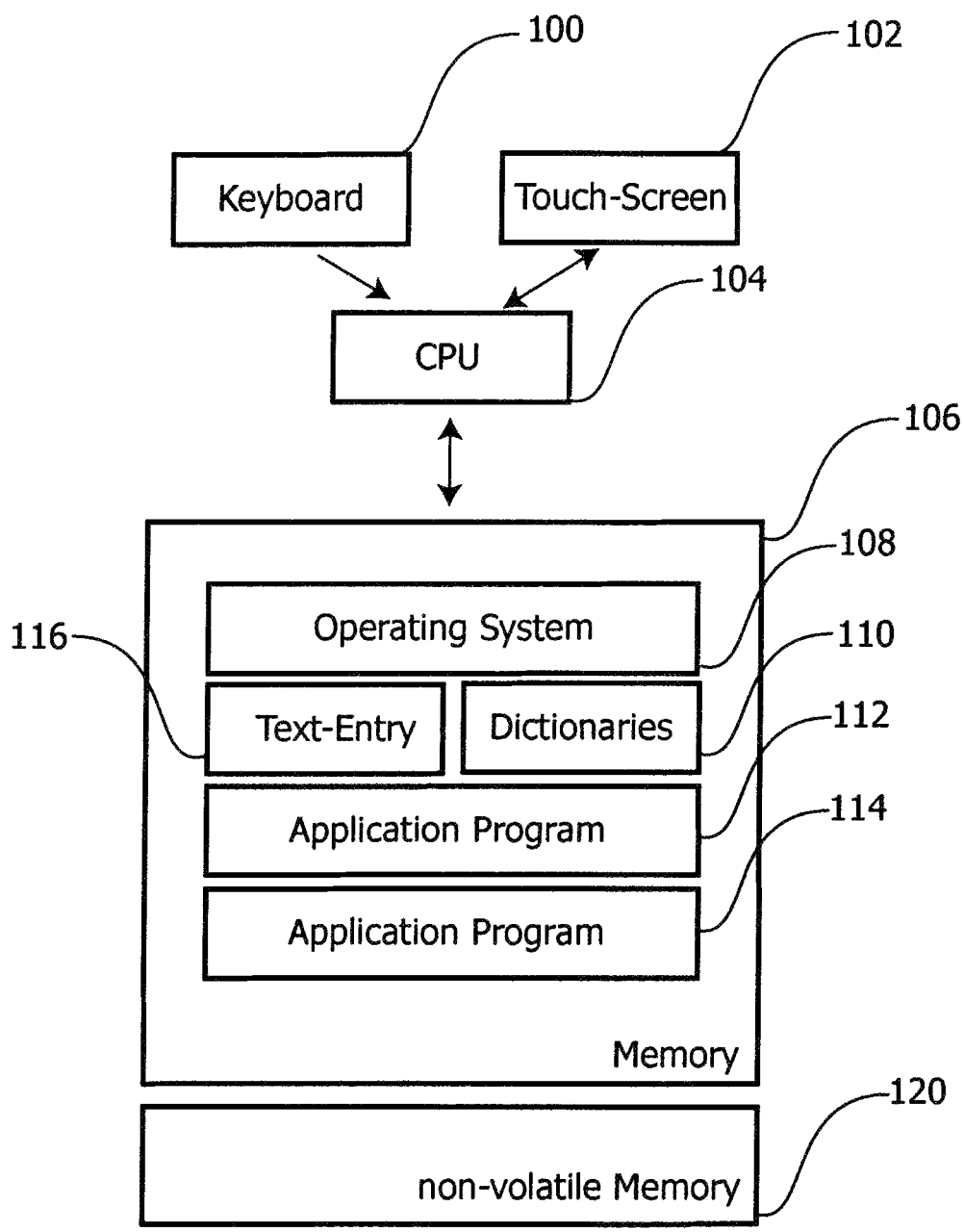
FIG. 1 is a block diagram of a device including the predictive data entry mechanism of the present invention.

FIG. 1 is a block diagram of the operating environment of the present invention.

The system 10 of the present invention includes an input device 100 which may be a keypad, keyboard, touch sensitive screen or the like which hereinafter will be referred to as keyboard 100. The system 10 further includes a display 102 for displaying the text entered as well as an m word list of predicted words, the screen may be an LCD screen or the like, and in the case of a touch sensitive screen the display 102 may serve a dual purpose both as a display and as the keyboard 100.

The present invention will work with any means for inputting text, and any means for displaying text.

As further illustrated in FIG. 1, the system 10 includes a processor or central processing unit (CPU) 104 which executes commands via an operating system 108. The system 10 may include a plurality of application programs 112, an application for decoding handwriting into text 116, an application which displays text 114 and one or more dictionaries 110.

It should be appreciated that the text recognition application 116, the display application 114, and one or more of the dictionaries 110 may be implemented as firmware or microcode stored on a non-volatile memory 120 such as an EPROM, EEPROM or the like. Use of the term "software" throughout this disclosure should be interpreted to include software implemented through firmware and stored on a non-volatile memory medium.

The present system is realized as software or firmware or the like, architecturally located between the operating system 108 of the computer 104 and the application 112 that receives text as input, e.g. a word processor.

The system 10 is language specific and has one or more dictionaries or vocabulary modules. The dictionary 110 and keyboard 100 are language specific. However, the software may allow for switching dictionaries and thus switching languages.

A key aspect of the invention relates to its ability to predict the next word the user will input based on the preceding words or delimiters which will hereinafter be referred to as the context or precursor. It is notable, that the context may also arise from the type of application receiving the text or the type of text field receiving the text. In the first case, the application may give a hint to what kind of style the user will use (SMS, short message service: colloquial writing vs. word processor: formal writing). In the second case, some operating systems assign unique identifiers to certain text fields such as "name", "address", etc. This information may be used to activate a different dictionary containing all names, addresses, cities etc.

The system 10 predicts the next word the user will enter based on the context, and displays a list of candidate words. The number of candidate words displayed is dependent upon the size and resolution of the display (the screen's real estate), and the font size in which the text is displayed. Moreover, the system 10 may optionally be configured to only display candidate words whose score exceeds a threshold value, further limiting the number of candidate words displayed.

Figure 2:
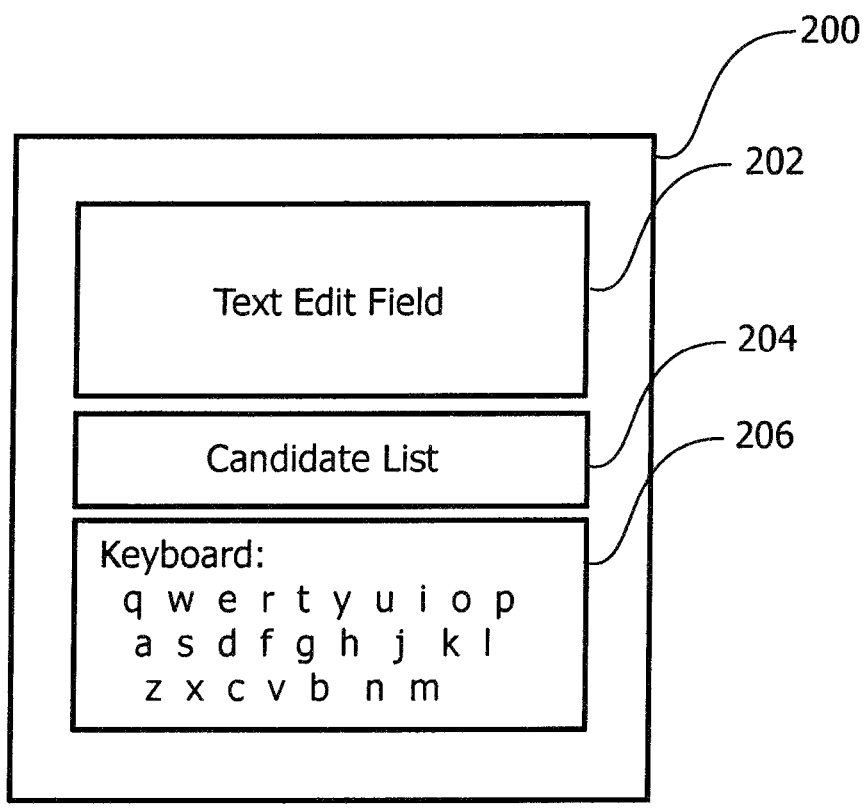
FIG. 2 shows a sample device including the predictive data entry mechanism of the present invention.

FIG. 2 is a block diagram of an illustrative device 200 employing the system 10 of the present invention.

The device 200 includes display having a text edit field 202 showing a text string entered or selected by the user. The display further includes a field 204 displaying a list of candidate words, and optionally a field 206 displaying a virtual keyboard.

Figure 3:
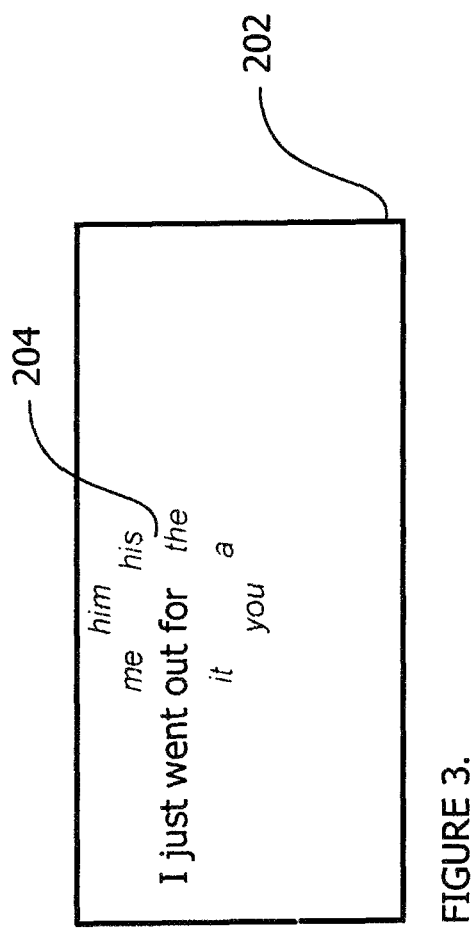
FIG. 3 shows one method of displaying candidate words.

It is important to note, that the list 204 may take different forms of presentation. For example, it may be realised as a circle on which the words are presented. This is illustrated in FIG. 3. This circle 204 may follow the position in the text where the current input is directed to (this is called cursor which usually takes the visual form of a blinking vertical bar). For the sake of simplicity, the structure that is presented to the user will be termed "list" in the following.

One of the important aspects of the invention is that the list of candidate words is context dependent. The system 10 selects candidate words by looking at the immediately preceding word or words which will be termed a precursor. The number of words defining a precursor may vary. It should be understood that the term "word" as used throughout the specification refers to a conventional word of text and to a delimiter such as a space, a period, a comma, a semi-colon and the like.

As will be described below in further detail, the system may iteratively reduce the size (measured in words) of the precursor in order to obtain a desired number of candidate words. For example, a three word precursor may have two corresponding candidate words. If the display has room for 10 words, the system may obtain additional candidate words by reducing the size of the precursor. A two word precursor may for example have four corresponding candidate words, and a one word precursor may have ten corresponding candidate words.

The system 10 includes at least one dictionary 110 including a list of candidate word entries; each candidate word entry includes an index and a candidate word. It should be understood that a given precursor may have many candidates. Thus, the same index may appear in multiple candidate word entries in the dictionary. For example the precursor "the" is likely to have many candidates. Each candidate word entry further includes a score indicative of the frequency of occurrence.

As will be explained below, the dictionary stored a plurality of candidate word entries. Each candidate word entry including an index, a candidate word, and a score. The size (measured in words) of the index may vary from entry to entry. Thus the dictionary may store candidate word entries having a one word index, and entries having a two word index, and entries having a three word index, etc. In this manner, the system may use a one word precursor or a two word precursor etc.

Optionally, the score may be a normalized number between 0 and 1.

Bi-Gram Embodiment

The method and system of the present invention will now be explained with reference to a bi-gram or two word embodiment in which the precursor is the immediately preceding word (or delimiter). In a tri-gram embodiment the precursor consists of the two immediately preceding words (or word/delimiter combination). Similarly, a four-gram embodiment the precursor consists of the three immediately preceding words. It should be understood that the teachings of the present invention may be implemented using any number of words in the precursor. The size of the index stored in the dictionary must correspond to the size of the precursor.

The dictionary 110 includes a plurality of candidate word entries; each candidate word entry includes an index, and a candidate word. The index is the key used to access the "candidate" word(s). It should be appreciated that a single precursor may have multiple candidate words. The index is at least one word or delimiter in length, but may consist of two or more words.

According to the bi-gram embodiment each candidate word entry in the dictionary 110 includes a list of two-word phrases in which the first word is termed the index and the second word is termed the "candidate" word. The precursor is the key or index used to access the "candidate" word(s). It should be appreciated that a single precursor may have multiple candidate words.

It should be appreciated that the precursor may be enlarged to include any number of words or delimiters. For ease of explanation the present example uses a one word precursor.

As noted above, each entry in dictionary 110 includes a score indicative of the frequency of occurrence, i.e. the frequency in which the user uses the phrase. A given precursor may have multiple candidate words, and the score associated with each candidate word may or may not be the same.

Each time the user enters (or selects) a precursor the system 10 searches the dictionary 110 for corresponding candidate words. The system 10 ranks the candidate words according to their score, and displays the first m number of candidate words in field 204.

FIG. 5 below contains an illustrative list of two word phrases.

The system 10 may treat the initial state before any word has been entered in the same way it reacts when the precursor is a delimiter such as a period. In this manner the system 10 may be configured to provide candidate words in the initial state before the user has entered a first character of the text.

The system 10 may be self-training in the sense that new phrases and their corresponding scores may be dynamically added to the dictionary 110. Moreover, the score of existing phrases may dynamically update to reflect changes in the frequency of usage.

According to a preferred embodiment, the system 10 is provided with a robust dictionary 110 such that the full benefit of the system is immediately available to the user.

Moreover, if the system 10 permits the score of existing phrases to dynamically update then the dictionary 110 will self-optimize to reflect the style, diction, and vocabulary of the user. Thus, even if the dictionary 110 is initially empty, the system 10 will compile its own dictionary reflective of the user's vocabulary, diction and style.

An initial dictionary 110 may be compiled by examining a body of text for x-word phrases, and ranking the frequency of the x-word phrases. In the bi-gram embodiment of the present example x will equal to 2.

Ideally the body of text used to compile the dictionary will contain a rich vocabulary and varied examples of style and diction.

The system 10 is especially useful for languages for which it is complex to input words, e.g. Chinese. The system 10 may thus operate on full symbols or on morphemes (one or more morphemes make up a word of a language) or even on syllables (e.g. Hiragana or Katakana in Japanese).

In the preceding example, the precursor was the immediately preceding word (or delimiter). However, one of ordinary skill in the art will appreciate that the invention may be readily adapted to select one or more candidate words using any size of precursor, e.g. a two or three word precursor.

In the aforementioned example, the candidate words were generated using the score associated with each dictionary entry, where the score is indicative of the frequency and is statistically generated.

However, the candidate list can also be generated using grammatical rules. For example, if the system 10 has identified a context in which only a verb can follow, all nouns will be excluded from the candidate list. If for example, one of the dictionaries (c.f. to FIG. 7 as an example) is extended to have word classes such as DETERMINER, ADJECTIVE, VERB, NOUN, etc. (these words are capitalised to reflect the word class and not the word itself) associated with words, then the precursor may be defined as a string of word classes. For example, one precursor may be "DETERMINER ADJECTIVE" and have "NOUN" as candidate. In this way, the phrases "the red car" and "a little girl" may be realized within one entry. The table in FIG. 7 is an example for a dictionary that maps words into their respective categories. The corresponding dictionary used to predict candidates from the preceding context is given in FIG. 8. FIG. 8 is also an example of varying sizes of context used for determining the precursor. While there is a rule that predicts a NOUN after a DETERMINER, there is also a rule that predicts a NOUN after a DETERMINER followed by an ADJECTIVE. This rule would predict "car" and "girl" after "a little". To determine a precursor, even more complex analyses may be performed rather than a mere mapping of word forms to word classes as is described below.

FIG. 7 provides a mapping mechanism for translating words into their respective classes. Such a translation table is a very simple mechanism of computing word classes from word forms. Other grammatical predictions based on more complex linguistic analyses of the context (rather than just mapping words to word classes) may be readily adapted to generate the candidate list. It is noteworthy, that the grammatical information need not be constrained to the word class. Additionally inflectional information maybe used (such as number: plural/singular, case: nominative/accusative, etc.) to further specify the grammatical information of the words. In this way $NOUN_{SING, NOM}$ (denoting a noun in singular, nominative) may specify the word "girl", but not the word "girls" (as this word is the plural form and would correspond to $NOUN_{PLUR, NOM}$). Rule based prediction for this precursor having the rule "precursor: NOUN$_{SING, NOM}$, candidate: VERB$_{SING, NOM}$", where VERB$_{SING, NOM}$ denotes a verb in singular, nominative, would prevent the candidate "wants" for the precursor "girls", but would allow the verb for the precursor "girl".

Also the translation of a grammatical precursor into a grammatical candidate class may be realized in more complex and algorithmic ways than the simple table that is given in FIG. 8. For example, a set of rules maybe iteratively or recursively applied before using the grammatical representation of the text just as a precursor.

A simple grammatical prediction system would generate the candidate list in the following way: first, translate the text written already into a grammatical representation (for example using table 4 given in FIG. 7). Next match the last n grammatical representations against the precursors in the table 5 (FIG. 8) and determine the candidate. Finally, translate the candidate back to word forms using table 4 (in FIG. 7).

It is noteworthy that several rules could match the grammatical context. In this case, the list of candidates may be constructed by combining the candidates resulting from the various matches.

In this version of predicting the text, the prediction was made using grammatical information (FIG. 7) and grammatical rules (FIG. 8) instead of statistical information. Of course, these two methods may be combined in order to obtain even better prediction. For example, the words in table 4 may have additional information about the frequency of use. In this way, a ranking of the candidates within one grammatical category may be obtained.

Generally speaking, the invention provides two methods for inputting a word of text. First, the user can type in words, character-by-character, using the keyboard. Second, the user may select a displayed candidate word. It should be understood that reference to typing in a word includes any method of entering text.

As noted above, the system may provide one or more candidate words in the initial state before the user has provided a precursor.

According to a further refinement of the present embodiment, the system may refresh or update the candidate list in response to character(s) entered by the user. More particularly, the system responds to the user's entry of the first letter of the desired word by displaying only those candidate words whose initial letter corresponds to the entered letter. In this case the candidate words are selected in accordance with the precursor and the characters entered by the user.

It is important to appreciate that the aforementioned refinement is significantly different from the prior art disambiguation methods described in the background of the invention. The prior art methods simply lookup words in a conventional alphabetic dictionary whose initial letter(s) correspond to those entered by the user. Since the conventional dictionary is not context driven, the system will display words which do not fit the context. In fact the system will respond with the same list of words each time the user enters a given letter, regardless of the context.

In contrast, the present invention selects candidate words based on the context (precursor). The list of candidate words are ordered according to the score and only the first m words are displayed. The aforementioned refinement narrows the list of candidate words by selecting only those candidate words whose initial letter(s) correspond to those entered by the user. Thus the refinement makes the score a secondary sort key rather than the primary key. Most importantly, the present system will provide suggestions for words following the word just entered. Thus, there will be candidates for the next word although no key stroke has occurred. None of the prior art has claimed such an ability. Prior art only assists the user complete the current word. The present invention predicts the word following the current word.

In the simplest case, the score mentioned above may be the frequency of use.

Optionally, the processor will dynamically adjust the size of the precursor to ensure that the system obtains a desired number of candidate words. Thus, if the system retrieves too few candidate words it can dynamically reduce the size (in words) of the precursor. Alternatively, if the processor retrieves too many candidate words it can dynamically increase the size (in words) of the precursor. In other words, if the number of candidate words retrieved is a threshold number of words greater than the number of words which may be displayed on the screen then the processor can dynamically increase the size of the precursor. Using our example, the processor may shift from a bi-gram which uses a one word precursor to a tri-gram which uses a two word precursor, i.e. the two words which immediately precede the word to be entered.

Optionally, the dictionary 110 may include a list of individual words (candidate words without an associated precursor) and their respective score in addition to the aforementioned x-word phrases. These single word entries will be termed orphan words. As will be explained below, these orphan words are used to supplement the candidate words when the number of candidate words falls below a pre-defined threshold number. For example, if there is only one candidate word for a given precursor, the system 10 may display one or more of the orphan words.

The embodiments and refinements discussed above were explained with reference to a single dictionary 110. However, the present invention may be implemented using multiple dictionaries 110 without departing from the scope of the invention. For example, a first dictionary 110 may be used to store single word (one-gram) entries and their respective scores, and a second dictionary 110 may be used to store two-word (bi-gram) phrases and their respective scores. Alternatively, the system 10 may include a fixed, pre-defined dictionary 110 and a user-defined dictionary 110. Thus the concept of the invention may be extended to include any number of dictionaries. Also, as mentioned above, different dictionaries may be used for different receiving applications or different text fields.

As computing power is generally limited in portable devices it may be useful to keep the dictionaries 110 in different tables. Generally, a one-gram table/dictionary will be smaller than a bi-gram dictionary and thus can be searched faster. However implementation details do not change the scope of the invention and one of ordinary skill in the art will appreciate that there are different possibilities to implement the dictionaries and their access. For example the mapping from precursor to candidates may not be realised through an index, but may arise from a more complex computation. This may be the case for predictions based on grammar.

One method for calculating the score for a dictionary will now be explained with reference to the following example. Consider the following text:

"The cat sat on the mat. The dog came along. The dog chased the cat."

Dictionary Build Up:

Generally, the text is pre-processed, to include a leading delimiter such as a period as the first character. Moreover, a space is inserted between words and delimiters (periods, commas and the like) in order to isolate the delimiters.

Afterwards, the above sentence would read:

". The cat sat on the mat . The dog came along . The dog chased the cat ."

For building up a one-word (one-gram) dictionary, the words and their frequency are counted. In the present example, different word cases (differences in capitalization) are treated as different words, i.e. "The" and "the" would be to different words.

Table 1 (FIG. 4) shows the one-word dictionary for the example text.

For building up a two-word (bi-gram) dictionary, combinations of two words and/or delimiters are used as entries for the dictionary (c.f. Table 2, FIG. 5).

It is apparent from FIG. 5 (Table 2) that for bi-gram frequencies, the text corpus used for training must be larger to get better estimates of the frequencies. Here, most frequencies have the value of one. Correspondingly for a tri-gram frequency in which the precursor is two words the text corpus used for training must be even larger still to get better estimates of the frequencies.

Initial Word Candidates:

As described above, the system 10 may be configured to present a list of candidate words in the initial state before the user has entered a precursor. In the preferred embodiment these candidate words are generated by looking at bi-grams, where the precursor is in fact a period. Using the bi-gram dictionary above, the only candidate: is "The", as there is only one bi-gram entry in the dictionary starting with the period, namely ". The".

Obviously, it is desirable to have a full complement of candidate words in order to provide a reasonable number of selections from which to choose. According to one embodiment, any empty slots in the candidate list may be filled by orphan (one-grams) words in decreasing order of frequency. Words that already appeared due to bi-gram frequencies will be excluded from the fill-up items.

In an initial state which assumes a precursor ".", the following eight item candidate list may be selected using the one-gram and bi-grams (FIGS. 4 and 5): "The . cat the dog sat on mat" The first candidate "The" is selected from Table 2 using the precursor ".". However, since FIG. 5 does not contain any other candidates for the precursor ".", the remaining seven words are selected from the orphan word dictionary (one-gram) FIG. 4 (Table 1) according to their score.

Entering Text Using Candidates only:

Continuing with the previous example let us assume that the user selects the candidate word "The" and this word is then displayed in the text output field 202. The system 10 now makes "The" the precursor and selects a new list of candidates. The two obvious candidates from the bi-gram dictionary given in table 2 would be "cat" and "dog". As "The dog" has the frequency 2, it will rank higher after sorting. Again, the rest of the list would be filled up by orphan (one-gram) words.

The new list presented in field 204 to the user would thus read like: "dog cat . The the sat on mat". The user could now choose the word "sat". The only item in the bi-gram dictionary would then be "on", and so on.

Entering Text Using Candidates And Keyboard:

According to the aforementioned hypothetical, on start-up, the system 10 generates the following initial candidate: "The . cat the dog sat on mat". If the user enters a character instead of selecting a candidate word, for example the character "t", then the system filters out all words from the candidate list that do not begin with the letter "t" independent of the capitalization of the candidate words. In the present situation, there would only remain two words that make up the reduced list: "The the". Again, the residual positions would be filled up by orphan (one-gram) words, in the present case (i.e. the present dictionaries in Tables 1 and 2) however, there are none.

Constructing A User Dictionary:

According to one refinement, the system 10 adapts to the user's style by tracking the words that the user enters by building up X-gram and one-gram frequencies, where X is any integer value greater than 1. The X-gram and one-gram frequencies may all be stored in a single dictionary 110. However, according to a preferred embodiment, one dictionary 110 contains predefined X-gram and one-gram frequencies and another dictionary 110 stores user-defined X-gram and one-gram frequencies. The user-defined X-gram and one-gram frequencies will be different in their distribution from the pre-defined dictionary(s) 110 which were computed from a different corpus of text. The text corpus may, for example, include newspapers, stories, etc. and will thus differ from the user's style. The text corpus used to construct the pre-defined X-gram and one-gram frequencies may be very large compared to the user's inputs. Consequently the frequencies of the respective dictionaries 110 may need to be normalized to the overall size of the corpora and combined to have a reflection of the user's writing style in the candidate list.

Normalization of the one-gram dictionary (Table 1, FIG. 4) will result in Table 3 (FIG. 6). Please note that the summed frequency which by definition equals the overall size of the corpus of the words is 19.

Note that, due to a division by a constant factor, the order of frequencies remains the same. Note also, that all values range between 0 and 1. Such normalization would be computed for all dictionaries. Thus, independent of their size and absolute frequencies, they would contain words with frequencies ranging from 0 to 1. When computing the combined score by which candidates are ranked, now there would be a 1:1 influence between two dictionaries on the ranking.

In the present embodiment, the score is computed for a candidate word in the by the normalized frequency of the delivered dictionary plus the normalized frequency of the user dictionary times a scaling factor. The scaling factor accounts for the stronger influence one would want to give to the user dictionary. However, different formulae may be used to compute the overall scores used for ranking the candidate words.

The normalization and computation of the score is analogous for the bi-gram dictionaries.

Also, more than two dictionaries may be used for computing the score. The procedure would be analogous to the aforementioned procedure.

Example for Inputting Text:

FIG. 9 illustrates an embodiment of the invention based on a depicted example for inputting text. FIG. 9a shows an example display of a text input device according to the invention. The display is arranged similar to the embodiment shown in FIG. 2. The top part of the display represents a text edit field displaying a text string entered by the user. The middle part displays a list of candidate words. The lower part of the display represents a virtual keyboard. The virtual keyboard is optional and used for illustrative purpose. Alternatively, a hardware keyboard having a plurality of keys may be employed for text input.

Figure 9A:
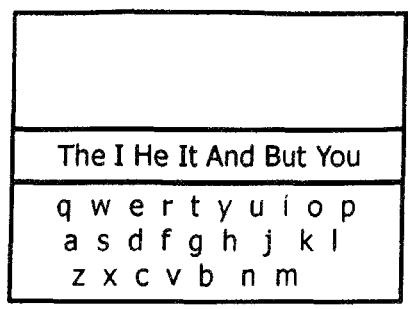
FIG. 9 illustrates the operation of an embodiment of the invention.
Figure 9B:
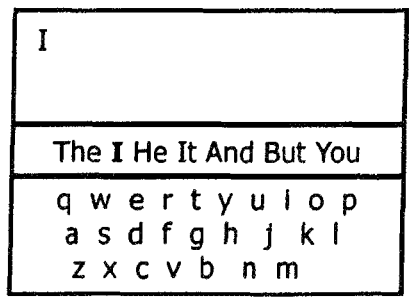
Figure 9C:
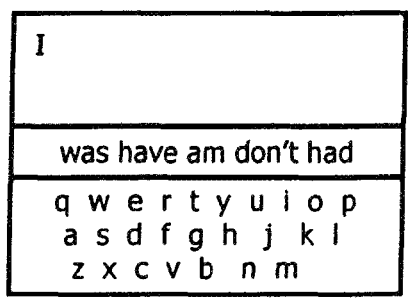

FIG. 9a shows the initial state of the input procedure. The text edit field is empty and a list of words with which the user most frequently starts a sentence is displayed as candidate list. If the intended sentence starts with on of these displayed candidate words, the user must simply select the respective word, e.g. by operating a pointing device to move a cursor to the intended word and activating the word by clicking on it or pushing an 'ok'-key (FIG. 9b). The selected word is then displayed in the text edit field. Next, a new candidate list is presented (FIG. 9c). The candidates are selected from the dictionary based on the current context. In general, the candidates are words that best fit the current context. Depending on the statistical model applied, the context in this state will be the previously selected word as precursor for a bi-gram model, or the marker for the begin of a sentence (e.g. the period character '.') and the previously selected word ('I' in the shown example) for a tri-gram model. Again, the user can select one of the candidates which to be added to the text edit field. That way, the input text forms word by word. This procedure is repeated until the end of the input text. In the best case, a whole sentence can be entered by selecting only candidate words. This leads to only one stroke or click per word and enhances usability.

Figure 9D:
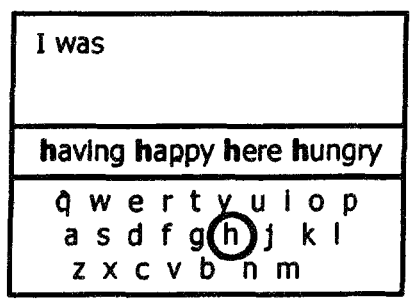

If the intended word is not in the candidate list, the user can strike one of the keys on the keyboard or select a letter from the virtual keyboard with the pointing device. A new set of candidates will be listed that begin with the selected letter (FIG. 9d). The new candidates are selected from the dictionary based on their likelihood (score). For instance, the highest ranking X-gram words (e.g. bi-grams, tri-grams, etc.) starting with the selected letter(s) and matching the context may be selected and displayed. Higher ranking X-grams starting with different letters are suppressed. Alternatively, the most frequent one-gram words irrespective of the context may be selected and displayed. Both methods may further be combined, e.g. if not enough X-grams starting with the selected letter(s) for the present context are available. Then, frequent words matching the initial letter(s) may be filled in the displayed candidate list. Preferably, the words in the candidate list are sorted according to their scores, the more likely ones at the left (or right) side of the display. This simplifies the selection of a candidate as the more likely ones can be selected with fewer strokes or clicks.

Figure 9E:
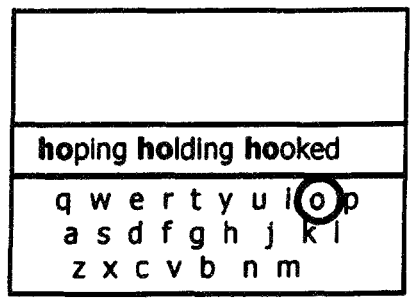

More letters can be entered, thus further constraining the list of candidates (FIG. 9e). Preferably, the list of candidates is re-sorted according to the word likelihoods when the list is further constrained based on additional letters. In most cases, the intended word is displayed with only a few input letters and can be selected by the user. If there is no matching candidate and the user enters a "space"-character (or any other designated special character), the system will enter a teach mode where the new word will be learned and added to the dictionary. In the future, the new word will appear in the list of candidates and can easily be selected. Thus, the system is adaptive and learns the vocabulary of the user.

The above example uses a QWERTY-type of keyboard, either virtual or real. Of course, other types of keyboards can be used as well. For instance, a handwriting recognition or a telephone type of keypad commonly applied in mobile phones, wireless communication devices, PDAs (personal digital assistance) or other portable and/or handheld devices can be used. For these keypads (sometimes referred as 'touch tone' or DTMF keypads), the digit keys are assigned with a plurality of letters each. For instance, the digit '2' has assigned the letters 'A', 'B', 'C' of the alphabet. The user presses the '2'-key to input that he/she wants to select either 'A', 'B' or 'C' (or 'a', 'b', 'c' if the system differentiates between lowercase and uppercase letters) The present invention will then restrict the selected candidates to words that match either of the letters associated with the pressed key. These constraints for the candidates are not that strong as if only one letter would be selected, but due to the text prediction capabilities based on the word context as applied by the invention, in most instances, it is still possible to narrow down the candidate list to only a few displayed candidates which allows the user to easily select the intended word. In most cases, the number of available candidates will go down rapidly to a single candidate with only a few keystrokes, even if the keys are not unambiguously assigned to individual letters. The user then only has to confirm that the remaining candidate is the intended word, or activating a designated key for entering the learning mode if the intended word is not displayed.

As already mentioned, most mobile phones do often not provide a full keyboard or touch screen. On mobile phones, the candidate word may be selected by a pointing device, such as a joystick or wheel, or by pressing a key having multiple characters associated. If the intended word is not suggested at first glance (that is displayed in the candidate list), the user can normally evoke it by pressing one of the digit keys in much the same way as in conventional single-tap text entry systems (i.e. the correct letter is proposed by only striking the corresponding digit key once). However, while conventional single tap systems construct a word letter-by-letter from the dictionary, the present invention selects it from the most probable candidates for the current context. Thus, the user gets words proposed immediately after entering the first key and at a higher probability of predicting the correct word.

Teaching New Words:

In the case where the intended word is not in the dictionary and thus can not be predicted, a text input system according to an embodiment of the invention automatically changes to a teach mode and allows the user to input the new word in an intuitive way. That way, the system vocabulary is extended and adapted to the user's vocabulary. In order to allow the identification of the new word with as little keystrokes as possible, the embodiment uses the information the user has entered already, i.e. the sequence of key codes entered during the previous attempt to select the correct candidate word. Please remember that when using a digit keypad as input device, the individual digits are assigned to a plurality of letters each. Thus, the sequence of key codes, being characteristic for a digit string such as '7825489', is highly ambiguous for the sequence of associated letters. Usually the digit keys have 3 or more associated letters, respectively, and the above digit string will result in 4*3*3*3*3*3*4=3888 possible letter sequences (ignoring lowercase/uppercase distinction and special characters present in many languages which would further increase the number of possible letter strings). As the intended word is not listed in the dictionary, the same is of no help for constraining the letter sequence. In the prior art, the user has to enter the new word in the teach mode by applying a multi-tap input system where each letter requires one or more keystrokes of the associated digit key (e.g. 3 strokes of the 2-key for entering the 'C' character). This is cumbersome and results in that the teach mode is rarely used and the vocabulary not extended or adapted to the user's writing customs.

In order to reduce the number of necessary clicks or keystrokes for inputting a new word in the teach mode, an embodiment of the present invention uses the information that the user has already entered. The system displays a first suggested string of letters selected from the possible letter sequences for the initial key sequence. Preferably, the suggested string is the most probable letter sequence corresponding to the entered key sequence. The system will then prompt the user to make corrections to letters in the suggested string in order to identify the intended word. The user may replace one or more of the suggested letters until the word is correct. Preferably, the replacements are caused from left to right and upon a letter replacement the remainder of the suggested string (i.e. to the right of the replacement) is recalculated. The recalculation determines the most probable sequence of following letters to fill-up the displayed letter string to the end. As the user has already entered an initial key sequence, the total number of letters for the intended word are known. This allows the user to input the intended word with only a few corrections of suggested letters. As the possible alternatives to the displayed letters are little (only the letters which are assigned to the respective key are to be considered), the replacement is simple and fast. Thus, the invention provides a user friendly text input in the teach mode of a text input device.

The calculation of the most probable letter sequence corresponding to the initial key sequence is preferably based on character transition probabilities such as character bi-grams or tri-grams. Character transition probabilities may be estimated based on statistics such as frequencies of occurrence of character pairs, triples, etc. in text and represent phonotactic characteristics of a language. For instance, while in some languages the character combination 'sz' is very unlikely, it may be quite common in another language. Thus, character transition probabilities are preferably language dependent and the statistical model corresponds to the language of the applied dictionary. The character transition probabilities are stored in a memory of the input device. The character transition probabilities may be estimated from a text corpus beforehand and loaded into the device and/or may be updated based on the text input into the device during usage. This allows to adapt the character transition probabilities to the user's vocabulary and to consider character combinations which are in general not likely, but which are frequently used by the user of the particular device, for instance for proper names mentioned often in the user's texts.

The calculation of the most probable letter sequence may be based on a sequential left-to-right algorithm which sequentially selects the most probable alphabetic letter matching the constraints of the entered key sequence. The algorithm starts with a word delimiter and selects the most probable letter of the allowed set for starting a word. Next, the letter of the set corresponding to the second entered key having the highest likelihood of following the selected first letter is determined. This is continued for the following letters of the suggested sequence using the probability of letter pairs or triplets, for example, until the end of the sequence. If one of the suggested letters is replaced by the user, the following letter is recalculated based on the new context and the letters following to the right are adjusted accordingly. Thus, a new string is suggested and displayed each time a letter is corrected.

Preferably, the user starts correction at the natural starting point for words according to the input language, which is from left to right for most languages, but the present invention is not restricted thereupon and may be implemented for other input orders as well. Alternatively, an algorithm like the Viterbi-algorithm is employed to calculate the overall most probable sequence of letters for the given constrains. This algorithm selects the string of letters with the highest combined probability for the entire sequence. When the user makes corrections to individual letters, the search trellis is further restricted to the replaced letter and a new optimal path in the trellis is computed. The optimal path corresponds to the most probable sequence of letters for the updated constraints and the recalculated sequence of letters is displayed as new suggestion.

The teach mode according to an embodiment of the invention is further explained based on the following example. Imagine the user wants to input the word "Quality" and the word is not in the dictionary. During the text prediction phase, the user has already entered the corresponding key sequence "7825489", but the intended word was not listed in the candidate list. The system calculates the most probable letter sequence corresponding to the key sequence using letter bi-grams or tri-grams. In the example, the string "stality" is determined in this manner as suggestion and displayed to the user. By moving a cursor key, e.g. the left arrow key, the teach mode is activated and the cursor positioned at the beginning of the suggested letter sequence, i.e. the character 's'. The user can now correct this character if necessary. In this example, the user replaces 's' with 'Q'. The reset of the word is recomputed automatically, i.e. letter transition probabilities are applied to find the most probable letter sequence starting with 'Q' and meeting the constraints imposed by the input key sequence. In this case, the most likely letter from the set 'tuvTUV' corresponding to the second key ('8') is determined. This is the letter 'u' in the present example as it has a high probability of following 'Q'. The method continues and the suggested letters are determined to "Quckity" which is displayed to the user as updated suggestion. The user can then move the cursor to 'c' and change it to 'a' (out of the set 'abcABC' for the '2'-key). Again, the most probable letters following the corrected letter are determined. Here, the next letter in the present sequence is 'k' which is unlikely to follow 'a'. Thus it is replaced by the embodiment with 'l' having a higher probability of trailing 'a' in a bi-gram example or 'ua' in a tri-gram example. The recomputed letter string is now "Quality" which is the intended word. Thus, the user can select it, e.g. by entering the 'ok'-, 'enter'- or 'blank/space'-key. The new word can then be added to the dictionary and the teach mode quits. Please note that the intended word is entered from the suggested letter string with only the correction of 2 letters. The advantage of the present invention becomes even more apparent for longer strings. Due to the continues recalculation of the most likely letter sequence matching the already available information (i.e. the constraints imposed by the initial key sequence and the corrected letters), the quality of the suggested string improves rapidly and the intended word is attained with only a few corrections.

The user may correct a suggested letter by moving the cursor to the letter, e.g. by operating a joystick or cursor key, and selecting the correct letter from the set of letters assigned to the corresponding digit key initially pressed. That is the correct letter is from a small number of alternatives. For the correction, the user may use the digit-keys again by striking the respective key as many times as necessary to select the correct letter from the set of assigned letters, thus using a multi-tap selection algorithm. In the above example, this would require to hit the '7'-key 6 times for toggling through the sequence 'pqrsPQRS' assigned to the '7'-key until the 'Q' character.

Figure 10:
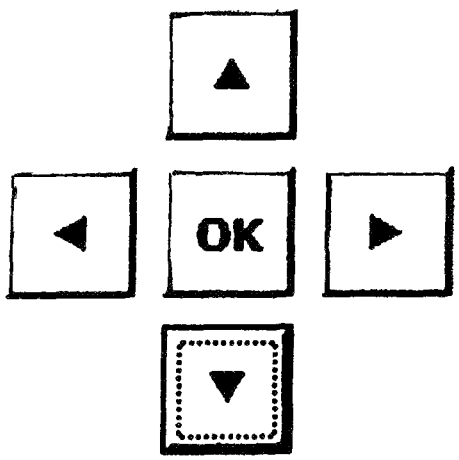
FIG. 10 shows an example to illustrate an embodiment of the invention for the correction of a suggested letter in teach mode.

Alternatively, the choices of letters available for a selected position in the suggested string are displayed and the user may choose the correct letter by selection, e.g. via cursor key or joystick. FIG. 10 shows an example to illustrate the concepts of the present invention for the correction of a suggested letter. The suggested letter sequence is "Quckity" and the user has positioned the cursor on the 'c' in the string, e.g. by using the cursor keys shown in the figure. The user can now use the digit-keys shown in the lower part of the figure for a multi-tap selection of an alternative letter. In addition, the alternative letters 'baB' to the suggested letter 'c' are displayed on the screen of the device for this example. Of course, character sets for other languages, such as German, together with the respective dictionaries can be used as well. In some languages more letters are assigned to the digit keys of the keypad, such as the German "Umlaute" 'äöü'. Preferably, the alternative letters are arranged according to their respective probability of following the previous letters in the sequence. More likely alternatives are arranged closer to the suggested letter so that they can be selected with fewer clicks or cursor movements. In the example shown in FIG. 10, the probability of 'b' and 'a' following the precursor 'u' is higher than for 'B'. Of course, the highest probability of following 'u' is for the suggested letter 'c'. The arrangement of alternative letters according to their probability further reduces the necessary number of keystrokes for the correction of the suggested string. Thus, the usability of the text entry device or method is enhanced. The arrangement of alternative letters may be linear or arced which would allow a more compact representation on a small display. The alternative letters may be arranged on one side of the suggested letter string (above or below), ranked according to the probability of the letters for fitting into the string, or on both sides of the suggested letter string, having more likely letters positioned closer to the presently suggested letter, which further reduces the number of necessary clicks or keystrokes as the two most probable alternative can be reached with a single click or keystroke. Other arrangements for the display of alternative letters are possible and within the scope of the present invention.

The above explained methods for identifying an input word based on letter transition probabilities according to the invention can be applied to digit key based text input systems without dictionary, too. In this case, the user may input digit key codes using single-tap first. Next, the system determines, based on the constraints given by the sequence of key codes, the most probable sequence of letters as suggested letter string. The suggested letter string may be corrected and is re-calculated, as explained above, until the intended word is displayed. The intended word identified that way can then be used as text input for all kinds of applications such as word processing or email.

As alternative, the text input of the invention based on letter transition probabilities can operate sequentially. As a digit key code (having a plurality of letters assigned) is input, the most probable letter is determined based on the letter transition probabilities and displayed as suggested letter. The alternative letters are displayed simultaneously in an arrangement which allows an easy selection and correction of the presently suggested letter, e.g. along a line or an arc intersecting the suggested letter. Preferably, the more probable alternatives are arranged closer to the suggested letter facilitating the correction by selecting an alternative letter. If a new digit key code is received, the presently suggested letter is accepted and a new suggested letter is determined based on the list of letters assigned to the new key and the letter transition probabilities. That way, letter by letter will be added to the suggested string, corrected and/or confirmed until the intended word has formed.

Figure 11:
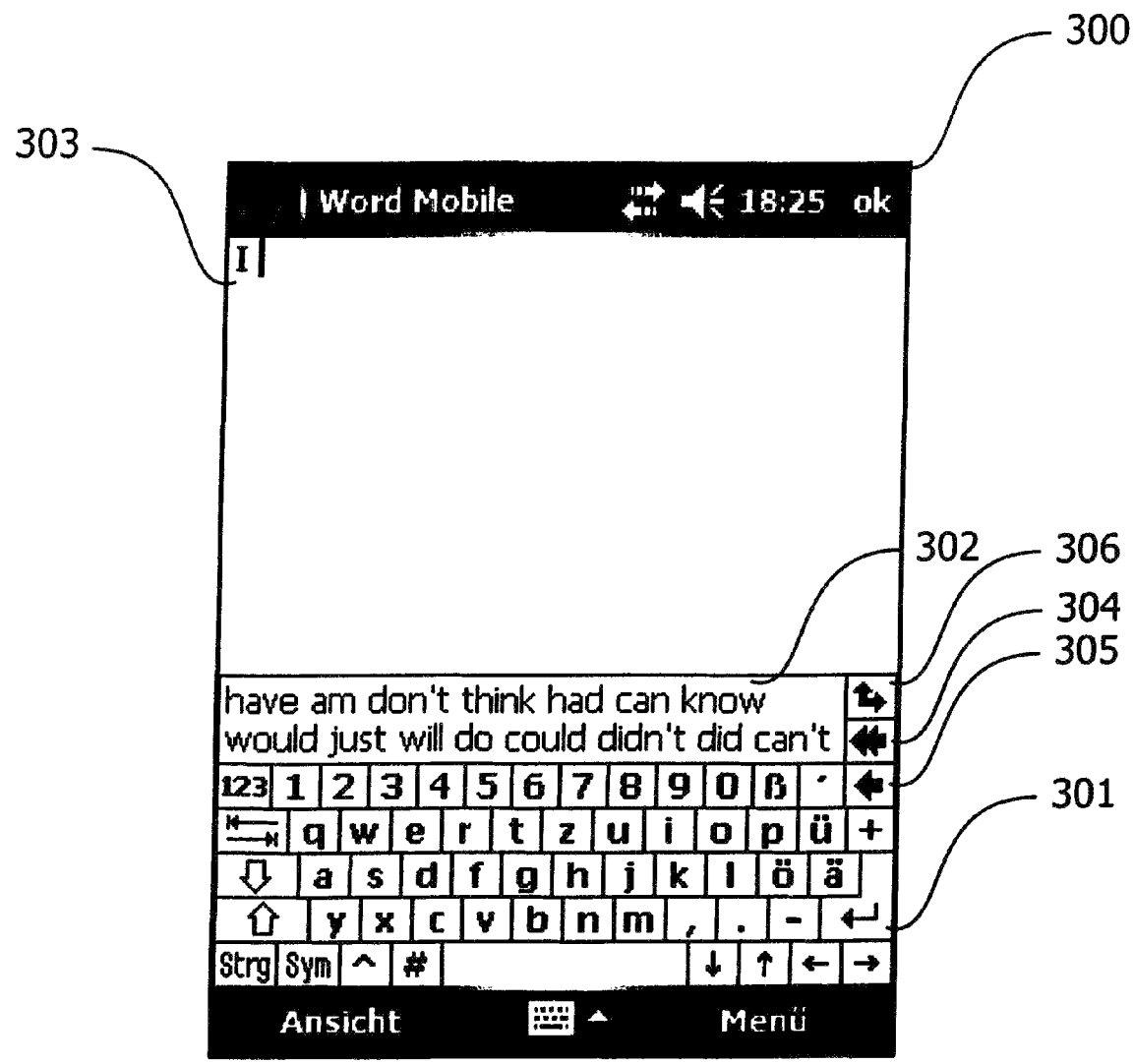
FIG. 11 shows an exemplary display screen of a personal digital assistant (PDA) using text input mechanisms according to the present invention.

Word-Level Keys:

FIG. 11 shows an exemplary display screen of a personal digital assistant (PDA) 300 using text input mechanisms according to the present invention. The PDA has a virtual keyboard 301 for activation by a pen or stylus, a display area 302 for displaying candidate words determined by the predictive text mechanism of the invention, and a text edit field 303 for displaying the inputted text. The arrangement is similar to FIG. 2. The candidates displayed in the display area 302 are the most probable words from the dictionary following the precursor word "I".

In addition to a regular keyboard, the virtual keyboard 301 comprises a WordBack key 304 for deleting the last displayed word in the text field or the last word before the cursor. The WordBack key 304 is equivalent, for word based text input systems, on the word level to a BackSpace key 305 as it operates on the level of words rather than on the level of letters and allows the deletion of a complete word with on keystroke. For instance for a predictive text input system or method according to the present invention, the user can easily delete the last word with the WordBack key 304 if he/she has previously clicked the wrong word in the candidate list 302. The WordBack key 304 may show a backwards double arrow symbol '◄◄' to indicate its function to the user.

The virtual keyboard 301 comprises an additional special key 306 named Up'n'Blank key. The Up'n'Blank key 306 is especially useful when the user enters a word that is not in the dictionary. In the teach mode, the system learns new words after receiving a teach mode indication signal, e.g. when the space bar or a punctuation mark is entered. There are situations where the system has to learn a capitalised word, e.g. a proper name such as "Peter". Users normally enter letters in small caps. In the case of a new name, the cursor will be a the end of the new word ("peter|") and the user would have to go back to the beginning of the word, delete the small cap initial letter ("|eter"), insert the capitalised letter ("P|eter"), go to the right position of the word again ("Peter|") before entering a blank ("Peter |") to allow the system to learn the word in the teach mode properly. This time consuming process can be shortened by providing a dedicated key for performing the entire correction process with one keystroke or click. At the end of a new word, the user may simply strike or click the Up'n'Blank key 306 instead of the regular space key and the previous word is automatically capitalised and a space character added to the input text. Preferably, the Up'n'Blank key 306 inverts the case of the initial character of the previous word. Thus, if the capitalisation was wrong, a second activation of the Up'n'Blank function associated with the key 306 will invert the initial letter of the previous word and return it to lower case which corrects the error.

The function of the Up'n'Blank key 306 is not only useful for the learning of new words, but has many advantages during normal text input as well. The functionality associated with the Up'n'Blank key 306 will allow a user to type text in lower case letters and to press or click the Up'n'Blank key 306 at the end of a word which is to be capitalised. As a space character is added to the capitalized word, the text input can continue with the next word. No additional keystroke is necessary. Compared to the usage of the normal shift key, one keystroke is saved and the somewhat difficult simultaneous operation of the shift key with the key for the letter to be capitalised is unneeded. The Up'n'Blank key 306 may show a special symbol to indicate its function to the user. For instance, a corner symbol having two arrows may be assigned to the key to indicate that the previous word is capitalised '●' and the text input continued with a blank '●'.

The implementation of the WordBack key 304 and the Up'n'Blank key 306 is particularly simple for a virtual keyboard, where a new input field showing the WordBack or Up'n'Blank symbol is displayed. Preferably the special purpose keys 304, 306 are arranged next to the candidate list 302, but they can be positioned differently. For a hardware keyboard, new keys need to be physically arranged at a convenient position. The functions of the new keys can be implemented as software in the keyboard driver module of the input device. This module receives signals when a virtual or real key is operated by the user and stores the input text in a keyboard buffer for access by other software applications. The input text can then be amended upon the activation of one of the word level keys 304, 306 according to the respective key function. Other software or hardware implementations will be contemplated by the person skilled in the art. The WordBack key 304 and the Up'n'Blank key 306 are preferably useful for portable devices having small or virtual keyboards and/or applying a predictive word level text input having possibly a teach mode for adding new words.

Although examples of an electronic device utilizing an efficient context-related data entry method and its use have been described and illustrated in detail, it is to be understood that the same is intended by way of illustration and example only and is not to be taken by way of limitation. The invention has been illustrated in the context of a cellular telephone and personal digital assistant. However, the data entry system may be used in a data entry application. Accordingly, variations in and modifications to the system and its use will be apparent to those of ordinary skill in the art, and the following claims are intended to cover all such modifications and equivalents.

The invention claimed is:

1. A method for deciphering an ambiguous text entry comprising:
providing character combinations and respective letter transition probabilities of such character combinations;
receiving a sequence of key codes, each key code being assigned to a plurality of characters from an alphabet;
determining, with a processor, a suggested sequence of characters from the alphabet corresponding to the sequence of key codes, wherein each character of the suggested character sequence matches one of the plurality of characters assigned to the respective key code and the suggested character sequence is determined based on the letter transition probabilities;
causing display of the suggested character sequence;
receiving an indication from a user to correct a particular character in the suggested character sequence;
causing display of alternative characters for the particular character in an order of respective probabilities of following a previous character;
receiving an indication from the user of a user-corrected character from the alternative characters;
causing display of the indicated user-corrected character replaced in the sequence of key codes;
determining a new suggested sequence of characters based on the sequence of key codes and the user-corrected character; and
causing display of the new suggested sequence of characters.

2. The method according to claim 1, wherein determining the suggested sequence of characters comprises determining a sequence of characters having an overall highest probability of accumulated letter transition probabilities.

3. The method according to claim 1, wherein the new suggested sequence of characters includes the user-corrected character in a specified position.

4. The method according to claim 1, wherein the alternative characters are displayed in an order according to probabilities for the alternative characters.

5. The method according to claim 4, wherein alternative characters having a higher probability are arranged in display closer to the suggested letter and alternative characters having a lower probability are arranged farther from the suggested letter.

6. The method according to claim 1, wherein an intended word is added to a word dictionary containing a plurality of entries used for dictionary based text input.

7. An apparatus, comprising
at least one processor and at least one memory including computer program code, the at least one memory and the computer program code configured to, with the processor, cause the apparatus to at least:
provide character combinations and respective letter transition probabilities of such character combinations;
receive a sequence of key codes, each key code being assigned to a plurality of characters from an alphabet;
determine a suggested sequence of characters from the alphabet corresponding to the sequence of key codes, wherein each character of the suggested character sequence matches one of the plurality of characters assigned to the respective key code and the suggested character sequence is determined based on the letter transition probabilities;
cause display of the suggested character sequence;
receive an indication from a user to correct a particular character in the suggested character sequence;
cause display of alternative characters for the particular character in an order of respective probabilities of following a previous character;
receive an indication from the user of a user-corrected character from the alternative characters;
cause display of the indicated user-corrected character replaced in the sequence of key codes;
determine a new suggested sequence of characters based on the sequence of key codes and the user-corrected character; and
cause display of the new suggested sequence of characters.

8. The apparatus according to claim 7, wherein the at least one memory and the computer program code are further configured to cause the apparatus to at least:
determine a most probable sequence of characters which meets conditions of the sequence of key codes and the user-corrected character.

9. The apparatus according to claim 7, wherein the at least one memory and the computer program code are further configured to cause the apparatus to at least: select, at each position in the character string, the most probable character corresponding to the respective key code and using the letter transition probabilities for determining the suggested sequence of characters.

10. The apparatus according to claim 7, wherein determining the suggested sequence of characters comprises performing a Viterbi-algorithm.

11. The apparatus according to claim 7, wherein the at least one memory and the computer program code are further configured to cause the apparatus to at least:

enter a teach mode for adding a new word to the dictionary upon receiving the indication of the user-corrected character.

12. The apparatus according to claim 7, wherein the user-corrected character comprises one of a character assigned to the key code of the user-corrected character.

13. The apparatus according to claim 12, wherein the user-corrected character is selected by a pointing device.

14. The apparatus according to claim 7, wherein the at least one memory and the computer program code are further configured to cause the apparatus to at least: add a newly identified intended word based on the user-corrected character to a dictionary.

15. A computer program product comprising at least one non-transitory computer-readable storage medium having computer-executable program code instructions stored therein, the computer-executable program code instructions comprising program code instructions to:

provide character combinations and respective letter transition probabilities of such character combinations;

receive a sequence of key codes, each key code being assigned to a plurality of characters from an alphabet;

determine a suggested sequence of characters from the alphabet corresponding to the sequence of key codes, wherein each character of the suggested character sequence matches one of the plurality of characters assigned to the respective key code and the suggested character sequence is determined based on the letter transition probabilities;

cause display of the suggested character sequence;

receive an indication from a user to correct a particular character in the suggested character sequence;

cause display of alternative characters for the particular character in an order of respective probabilities of following a previous character;

receive an indication from the user of a user-corrected character from the alternative characters;

cause display of the indicated user-corrected character replaced in the sequence of key codes;

determine a new suggested sequence of characters based on the sequence of key codes and the user-corrected character; and cause display of the new suggested sequence of characters.

* * * * *